UNITED STATES PATENT OFFICE 2,604,493

PROCESS FOR PRODUCING PRIMARY ALCOHOLS CONTAINING AT LEAST FOUR CARBON ATOMS

John W. Copenhaver, Easton, Pa., assignor to General Aniline & Film Corporation, New York, N. Y., a corporation of Delaware No Drawing. Application November 5, 1948, Serial No. 58,625

6 Claims. (Cl. 260—632)

This invention relates to a method of preparing primary alcohols containing at least 4 carbon atoms.

I have found that alkylidene diethers of the type disclosed in U. S. Patent No. 2,165,962 and those disclosed in my copending application, Serial No. 762,213, filed July 19, 1947, now Patent No. 2,487,525, issued November 8, 1949, are readily reduced to the corresponding primary alcohols with hydrogen in the presence of water, and preferably in acidic media using metallic hydrogenation catalysts.

The reaction involved in the process of the present invention may be formulated as follows:

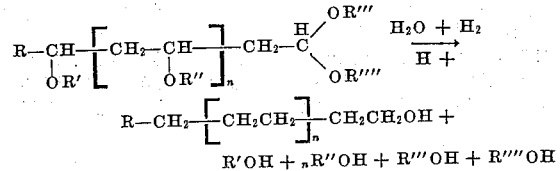

where R, R′, R″, R‴ and R″″ may be the same or different hydrocarbon radicals chosen from the group consisting of alkyl, aryl or aralkyl radicals and $n$ is a whole number, including 0, generally less than 10 and more usually less than 5.

The present invention may be most readily described in connection with the following example, which represents a prefered method of practicing the same.

Example 440 grams (2.5 mols) 1,1,3-trimethoxy hexane and 135 grams of water mixed with 20 grams of Raney nickel catalyst were placed in a shaking autoclave and reduced at 160° C. and 1450 pounds per square inch hydrogen pressure for 20 hours. The bomb was then cooled and the contents discharged and filtered to remove the catalyst. The methanol produced in the reaction was then removed from the filtrate by distillation and on cooling the residue it separated into aqueous and organic layers. The aqueous layer was removed and the organic layer was distilled to give a 54.5% yield of n-hexanol, boiling point 89/50° C. or 158° C. at atmospheric pressure, $n_D^{25}$ 1.4159. The product was characterized as n-hexanol by the preparation of α-naphthyl urethane melting point 59–60° C. Mixed melting point with an α-naphthyl urethane prepared with an authentic sample of n-hexanol showed no depression.

It will be understood that the foregoing example is illustrative only of the present invention, and various modifications thereof will suggest themselves to those skilled in the art.

Thus, while Raney nickel catalyst has been found to operate satisfactorily in practicing the present invention, other metallic hydrogenation catalysts such as platinum and palladium hydrogenation catalysts are also effective and may be used if desired, either in pure or supported form.

While the process is operative at room temperature, the rate of reaction at such temperatures is quite slow and therefore, a temperature of at least 100° C. is to be preferred. Higher temperatures, up to 200° C. may be employed if desired and in general the optimum temperature is within the range of 140° to 170° C. In order to assure a satisfactory rate of reduction, a hydrogen pressure of at least 1,000 pounds per square inch is preferably employed, although the process is operative at lower pressures, for example 400 pounds per square inch. Extremely high hydrogen pressures of 3,000 to 4,000 pounds per square inch show no substantial advantage in practicing the present invention, and the preferred hydrogen pressure is therefore within the range of 1,000 to 2,000 pounds per square inch.

As previously indicated, and as illustrated in the specific example, the reaction is carried out in an aqueous media and preferably at least one mol of water is present to each mol of alkylidene to be reduced, since diether as described in my copending application Serial No. 58,624, filed November 5, 1948, now Patent No. 2,516,679, issued July 25, 1950, when no water is present, and particularly in acidic media and at low hydrogen pressure, the acetal linkage is not affected to any great extent, with the result that only the ether linkages are reduced. While as described in my copending application Serial No. 64,039, filed December 7, 1948, now Patent No. 2,590,598, in the absence of water and at high hydrogen pressures, and particularly in a neutral to alkaline medium the acetal linkage is reduced to an ether group instead of the ether linkages being reduced.

As previously stated, the process of the present invention is applicable to the reduction of polyalkoxy acetals of the type illustrated in the equation above. However, since the OR groups are reduced to the corresponding alcohol during the course of the reaction, it is preferable for obvious economic reasons, as well as facilitating ease of separation, to employ alkylidene diethers in which the groups OR represent lower alkoxy. As examples of diethers of this type that may be employed, in addition to 1,1,3-trimethoxy hexane employed in the specific example, may be mentioned other 1,1,3-trialkoxy alkanes, such as 1,1,3 - trimethoxybutane; 1,1,3 - triethoxybutane; 1,1,3 - trimethoxy - 3 - phenylpropane; 1,1,3-trimethoxy-5-ethoxyhexane; 1,1,3,5 - tetramethoxyhexane; and 1,1-dimethoxy-3,5,7-triethoxyoctane and the like.

While the lower alkoxy acetals are preferably employed in practicing the process of the present invention, it will be apparent that aryloxy and aralkoxy acetals may also be employed, if desired. As examples of such compounds containing one or more aryloxy or aralkoxy radicals may be mentioned 1-phenoxy-1,3-dimethoxybutane, 1,1-dimethoxy - 3 - phenoxybutane, 1,1-dimethoxy-3-benzyloxybutane and the like.

While as indicated by the specific example given above, it is not essential that an acid be present during the reaction, the presence of a small amount of an acid reacting compound exerts no deleterious effect and, in fact, at times is preferable. As examples of acidic compounds which may be present during the reaction may be mentioned mineral acids such as hydrogen chloride, phosphoric acid, sulfuric acid and the like, and acid reacting inorganic salts such as zinc chloride, cadmium chloride, sodium bisulfate, organic acids such as acetic acid, p-toluene-sulfonic acid, and the like.

I claim:

1. The method of producing primary monohydroxy alcohols containing at least 4 carbon atoms, which comprises subjecting an alkylidene diether of the formula:

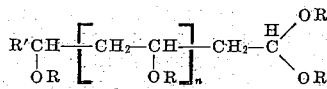

wherein R and R' represent hydrocarbon radicals selected from the group consisting of alkyl, aryl and aralkyl radicals, and $n$ is an integer from 0 to 10, to the action of hydrogen at a pressure in excess of 400 pounds per square inch and at a temperature of from 100–200° C. in the presence of water and a metallic hydrogenation catalyst selected from a group consisting of Raney nickel, platinum and palladium hydrogenation catalysts.

2. The process as defined in claim 1, wherein the hydrogen pressure is within the range of 1,000 to 2,000 pounds per square inch.

3. The process of producing primary monohydroxy alcohols containing at least 4 carbon atoms, which comprises subjecting a 1,1,3-tri-lower alkoxy hydrocarbon to the action of hydrogen at a pressure in excess of 400 pounds per square inch and at a temperature of from 100 to 200° C. in the presence of water and a metallic hydrogenation catalyst selected from a group consisting of Raney nickel, platinum and palladium hydrogenation catalysts.

4. The process as defined in claim 3, wherein the hydrogen pressure specified is within the range of 1,000 to 2,000 pounds per square inch.

5. The process as defined in claim 4, wherein the hydrogenation catalyst specified is a Raney nickel catalyst.

6. The process as defined in claim 4, wherein the reaction is carried out in an acidic medium.

JOHN W. COPENHAVER.

REFERENCES CITED

The following references are of record in the file of this patent:

UNITED STATES PATENTS

| Number | Name | Date |
|---|---|---|
| 2,121,580 | Berliner et al. | June 21, 1938 |
| 2,165,962 | Mueller-Cunradi et al. | July 11, 1939 |
| 2,242,017 | Normann | May 13, 1941 |